July 8, 1969 — R. B. CARTWRIGHT — 3,453,746
INSTRUCTION SYSTEM FOR PHYSICAL ENDEAVORS
Filed Aug. 12, 1966
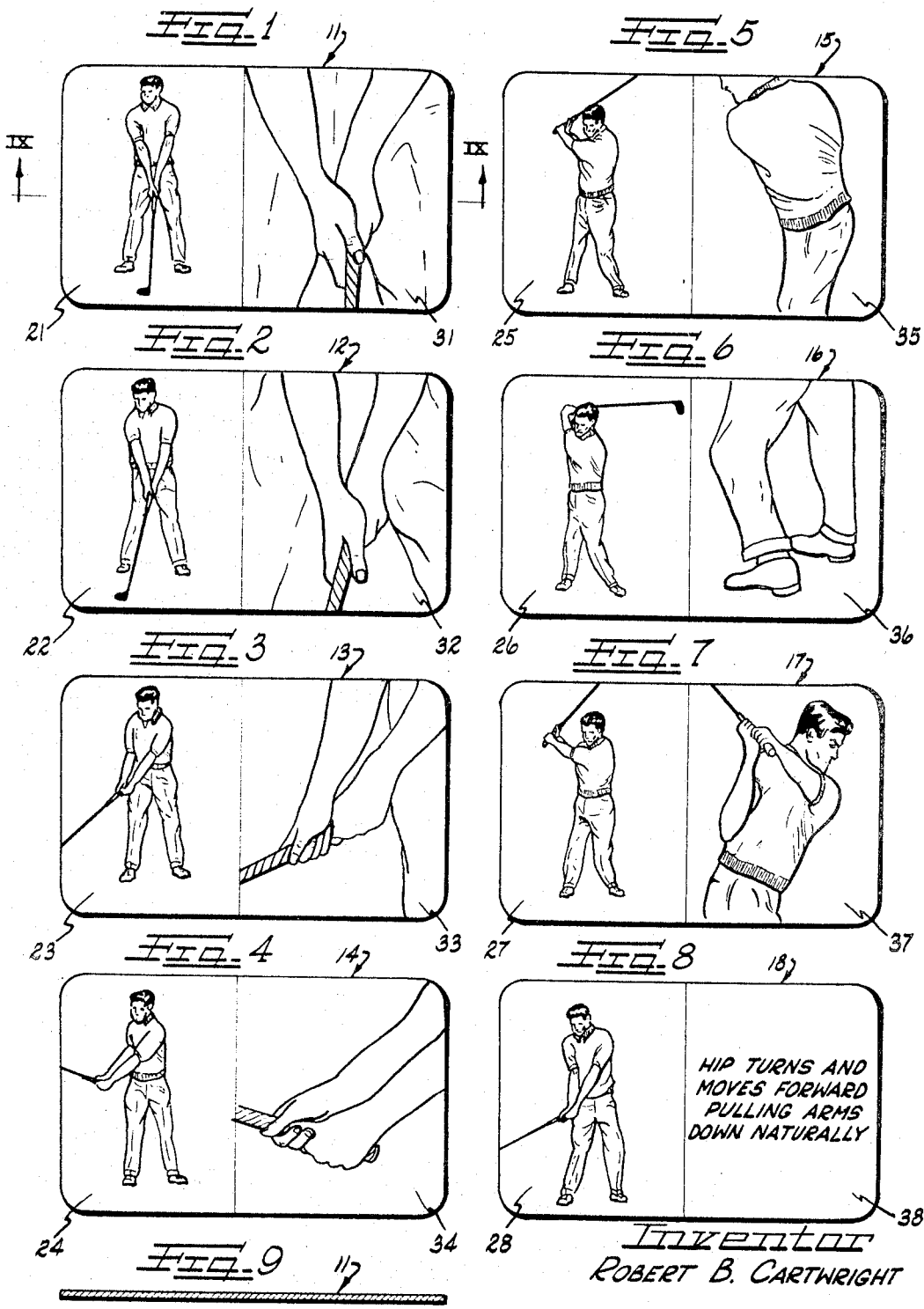
Inventor
ROBERT B. CARTWRIGHT

United States Patent Office 3,453,746
Patented July 8, 1969

3,453,746
INSTRUCTION SYSTEM FOR PHYSICAL ENDEAVORS
Robert B. Cartwright, 416 S. Edgewood,
La Grange, Ill. 60525
Filed Aug. 12, 1966, Ser. No. 583,154
Int. Cl. A63b 21/00
U.S. Cl. 35—29                   3 Claims

ABSTRACT OF THE DISCLOSURE

Instructional system for physical endeavors in which a series of pictorial representations are provided on first end portions of a stack of loose rectangular cards to produce upon flipping a motion picture sequence of the overall action of a golfer or other subject with instructional means being provided on opposite end portions including close-up pictorial representations showing features such as a golfer's wrist action, pictorial representations from different angles and descriptive material.

---

This invention relates to an instruction system for physical endeavors and more particularly for physical endeavors involving coordinated action of a plurality of bodily parts. The system is particularly designed for and is particularly advantageous in golf instruction, but is applicable as well in other games or sports involving the coordination of fingers, hands, wrists, arms, the torso and/or legs in order to obtain proficiency therein. By way of example, and not by way of limitation, the system can be used for instruction in baseball batting, baseball throwing, tennis, squash, badminton, angling, football kicking, football throwing, and also in track and field activities such as running, jumping, pole-vaulting, shot-putting, discus and javelin throwing and hurdling, as well as in bowling.

Various attempts have been made to teach golf and other physical endeavors through the use of motion picture photographs but difficulties have been experienced in that it has not been possible to convey to the pupil the desired impression of both the overall action and of the action of individual bodily parts, as related to the overall action. Reading material is not generally satisfactory because it is difficult to convey the desired impression through words and because it is difficult to correlate the words with the visual impression which it is desired to convey to the student.

This invention was evolved with the general object of overcoming the disadvantages of prior instruction systems and of providing a system which is very simple to use and through which the desired impressions can be readily, quickly and accurately conveyed to the student. According to this invention, a series of photographs or other pictorial representations are provided on faces of cards which are arranged in a stack and which can be flipped to produce a motion picture sequence of the overall coordinated action of a plurality of bodily parts. By way of example, the sequence of pictorial representations may be produced from motion picture photographs of an expert golfer executing a swing, taken from the front. A series of instruction means are provided on the cards to be presented to view upon opening of the stack, each of the instruction means containing information pertinent to the pictorial representation of the individual card which is then presented for examination.

With this arrangement, the student obtains an accurate impression of the overall coordinated action of the bodily parts by flipping the cards and at the same time, he can obtain the desired impression as to what he should know about the action of the parts at each point of the sequence.

In accordance with this invention, the instruction means could be presented on a card different from the card having the pictorial representation to which it is pertinent, but preferably the instruction means is disposed on the same face of each individual card as the pictorial representation to which it is pertinent. This avoids confusion and permits the student to obtain a more direct correlation of information.

In accordance with a further feature of the invention, at least one of the series of instruction means includes an enlarged close-up pictorial representation of bodily parts in the same positions as in the pictorial representation to which the instruction means is pertinent. By way of example, the instruction means may show the wrist action in a golf swing.

According to a further feature of the invention, at least one of the series of instruction means includes a pictorial representation of bodily parts in the same positions as in the pictorial representation to which the instruction means is pertinent, but from a different angle.

Still another feature of the invention is in the provision of written instructional material as at least one of the series of instruction means.

Another feature of the invention relates to the provision of instruction means in the form of a plurality of pictorial representations arranged to produce upon flipping of the cards a close-up motion picture sequence of the bodily parts depicted in the corresponding pictorial representation of the overall coordinated action. Here again, the wrist action may be desirably depicted, with regard to a golf swing.

A further important feature of the invention is in the overall method by which the cards are produced and used in order to obtain the most efficient and effective instruction of the student.

The invention contemplates other objects, features and advantages which will become more fully apparent from the following detailed description taken in conjunction with the accompanying drawings which illustrate preferred embodiments and in which:

FIGURES 1–8 are plan views of selected representative cards of a stack of cards, according to the invention; and FIGURE 9 is a cross-sectional view taken substantially along line IX—IX of FIGURE 1.

FIGURES 1–8 illustrate selected representative cards, designated by reference numerals 11–18, of a stack of cards according to the invention. The cards 11–18 are substantially identical in size and shape and as shown in the cross-sectional view of FIGURE 9 are relatively thin and of sufficient flexibility to be flipped to sequentially present faces thereof to view.

The cards are preferably rectangular with a length substantially larger than the width thereof and a series of pictorial representations 21–28 are provided on left-hand portions of the card 11–18, on one side of a mid-plane normal to the cards and half-way between the opposite ends thereof, while a series of instruction means 31–38 are provided on right-hand portions of the cards 11–18, on the opposite sides of the mid-plane. The pictorial representations 21–28 are arranged to produce upon flipping of the cards a motion picture sequence of the overall coordinated action of a plurality of bodily parts. In the illustrated system, the pictorial representations 21–28 are formed by taking motion picture photographs of an expert golfer from a position directly in front of the golfer and from a distance sufficient to provide a full form, head-to-toe, view and when the cards are stacked and flipped, the student obtains therefrom the correct overall impression of the coordinated action involved in executing the golf swing.

The instruction means 31–34 on the first four cards 11–14 are in the form of enlarged close-up pictorial representations of bodily parts in the same respective positions as in the pictorial representations 21–24. In the illustrated system, the pictorial representations 31–34 are produced by taking motion picture photographs of the wrist action of the expert golfer and by reproducing such photographs on the cards 11–14. With this arrangement, the student can hold the left-hand portion of the stack of cards and can flip the right-hand portions of the card 11–14 to obtain a motion picture sequence of the wrist action. In addition, the student can open the stack and examine each of the cards, to obtain an accurate impression as to the wrist action in relation to the overall swing. It will be noted that the cards 11–14 strongly emphasize that there is very little breaking or hinging of the wrist in the initial portion of the back swing which is highly important in executing the correct swing.

The instruction means 35 on the card 15 is a pictorial representation of bodily parts in the same positions as in the pictorial representation 25, but from a different angle. In the illustrated system, the instruction means 35 is formed by taking a photograph of the expert golfer from the left side and reproducing the photograph on the card 15, preferably with a substantial enlargement, as compared to the photograph of the full front view. When the card 15 is examined by the student, he receives the proper emphasis on the full turn of the torso and shoulders as the golfer approaches the top of the back swing.

The instruction means 36 on the card 16 is quite similar to the instruction means 35 on the card 15 except that it illustrates the leg and knee action of the golfer at the top of the back swing, and clearly emphasizes the inward turn of the left knee and the shifting of the weight to the right leg at this point of the swing.

The instruction means 37 on the card 17 is similar to the instruction means 35 and 36 on the cards 15 and 16, except that it is taken from the right side of the golfer. This photograph depicts the proper wrist position in the beginning portion of the down swing and shows to the student that the right elbow should be relatively close to the body and that it should point downwardly.

The instruction means 38 on the card 18 is in the form of printed material showing the student what to observe with respect to the pictorial representation 28 on the left-hand portion of the card 18. Because of the proximity of the printed instruction material to the pictorial representation, the student can quickly obtain an accurate grasp of the correct impression relative to the swing. In this connection, it is noted that each instruction means may contain printed material in addition to a pictorial representation when it is desired for proper emphasis. Further, instruction means may be provided which show for comparison purposes a pictorial representation of incorrect action, where it is more conducive to clarity and to the student's comprehension.

It is further noted that the eight cards as illustrated are only selected cards of a complete stack which preferably contains a substantially greater number of cards, but usually not more than sixty cards. Also, it is possible to provide a series of pictorial representations and corresponding instruction means on the opposite sides of the cards. For example, a full wood shot may be illustrated on one side and a short iron shot on the opposite side.

It will be apparent that the invention can be applied to other games and sports as well as to golf. For example, the invention can be applied to baseball batting, to illustrate the stance of the batter for hitting straightaway, to left field or to right field, the bunt and its relationship to the swing, with illustrations of the arm and wrist action at crucial points of the swing and up to the point of impact of the bat with the ball. In baseball fielding, the invention can illustrate the movements of the feet, legs and body to the left or right in preparation for the fielding of the ball and may also illustrate the recommended throwing arm movement in relation to body position immediately after a ball is caught. In baseball pitching, the invention can illustrate the full form or view variations for different pitches showing the wrist and arm action for curve balls, fast balls and such specialty pitches as the teacher may wish to reveal.

It will be understood that modifications and variations may be effected without departing from the spirit and scope of the novel concepts of this invention.

I claim as my invention:

1. In an instruction system for physical endeavors involving the coordinated action of a plurality of bodily parts of a person, a loose stack of flat rectangular cards of equal size each having first and second opposite end portions, said cards having a thickness and resiliency such as to permit said first end portions to be flipped by the fingers of one hand of the user while holding said second end portions together by the fingers of the other hand of the user to present said first end portions to view in rapid sequence and as to permit said second end portions to be flipped by the fingers of one hand of the user while holding said first end portions together by the fingers of the other hand of the user to present said second end portions to view in rapid sequence, said loose stack being also adapted to be opened to present for studied examination the entire face of any individual card, a first series of pictorial representations on said first end portions arranged to produce upon flipping of said cards a motion picture sequence of the overall coordinated action of said plurality of bodily parts with substantially the entire body of the person being in view in said sequence, and a second series of pictorial representations on said second end portions and on the same faces of said cards arranged to produce upon flipping of said second end portions a corresponding close-up motion picture sequence of the coordinated action of certain of the bodily parts depicted in said first series of pictorial representation, each individual card having on one face thereof both a pictorial representation of the condition of the entire body of the person at a certain instant of time and a close-up pictorial representation of certain of the bodily parts at the same instant of time to permit studied examination of the relationship of the position of said certain of the bodily parts to the position of the entire body.

2. In an instruction system as defined in claim 1, designed for golf instruction, said first series of pictorial representations being full front view pictorial representations of an expert golfer and said second series of pictorial representations being close-up pictorial representations of the wrist action of said expert golfer.

3. In an instruction system as defined in claim 1, said first and second series of pictorial representations being from the same viewing angle.

References Cited

UNITED STATES PATENTS

| | | | |
|---|---|---|---|
| 1,484,390 | 2/1924 | Gibbs et al. | |
| 1,787,592 | 1/1931 | Owens | 352—99 |
| 2,939,224 | 6/1960 | Rose et al. | 35—29 |

FOREIGN PATENTS

| | | |
|---|---|---|
| 609,520 | 2/1935 | Germany. |
| 555,358 | 8/1943 | Great Britain. |
| 713,071 | 8/1954 | Great Britain. |

EUGENE R. CAPOZIO, *Primary Examiner.*

HARLAND S. SKOGQUIST, *Assistant Examiner.*

U.S. Cl. X.R.

35—69; 352—99